United States Patent [19]

Maltman

[11] Patent Number: 4,825,895
[45] Date of Patent: May 2, 1989

[54] WATER INJECTION CHOKE VALVE

[75] Inventor: Michael Maltman, Logie Village, Scotland

[73] Assignee: Chevron Research Company, San Francisco, Calif.

[21] Appl. No.: 63,545

[22] Filed: Jun. 16, 1987

[51] Int. Cl.⁴ .......................................... F16K 31/122
[52] U.S. Cl. ..................................... 137/219; 251/31
[58] Field of Search .......................... 137/219; 251/31

[56] References Cited

U.S. PATENT DOCUMENTS

| | | | |
|---|---|---|---|
| 1,925,531 | 9/1933 | Grunsky . | |
| 2,150,077 | 3/1939 | Oehler | 277/57 |
| 2,416,787 | 3/1947 | White | 137/219 X |
| 2,676,611 | 4/1954 | Page | 137/461 |
| 2,918,249 | 12/1959 | Page et al. | 251/31 |
| 3,322,138 | 5/1967 | Backman | 137/219 |
| 3,824,033 | 7/1974 | Chacour | 137/219 X |
| 4,137,933 | 2/1979 | Culpepper | 137/219 |
| 4,173,327 | 11/1979 | Williams | 251/31 |
| 4,377,177 | 3/1983 | Claycomb | 137/15 |
| 4,444,220 | 4/1984 | Seger | 137/312 |
| 4,446,887 | 5/1984 | Redmon et al. | 137/556 |
| 4,471,941 | 9/1984 | Sims | 251/31 X |
| 4,518,148 | 5/1985 | Renfro | 251/122 |
| 4,519,574 | 5/1985 | Roper | 251/31 |
| 4,573,535 | 3/1986 | Manke | 166/321 |
| 4,611,630 | 9/1986 | Muchow et al. | 137/219 X |

FOREIGN PATENT DOCUMENTS

| | | | |
|---|---|---|---|
| 1312087 | 11/1962 | France | 137/219 |
| 771394 | 10/1980 | U.S.S.R. | 137/219 |

Primary Examiner—Gerald A. Michalsky
Attorney, Agent, or Firm—S. R. La Paglia; E. J. Keeling

[57] ABSTRACT

A choke valve for use on water injection wells is disclosed. The valve comprises a body, a sliding sleeve, in the body, a boss shaped plug, and a means for urging the sliding sleeve against the plug. The fluid path through the valve is largely straight, reducing wear on the valve, and the valve is devoid of screwed fittings.

3 Claims, 2 Drawing Sheets

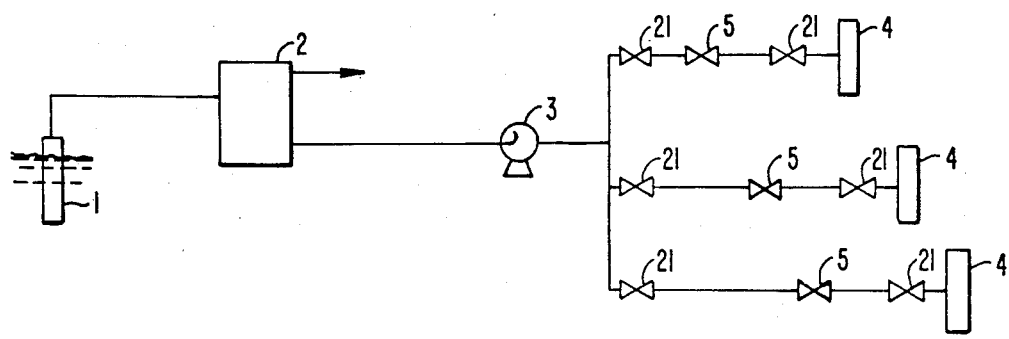
FIG._1.
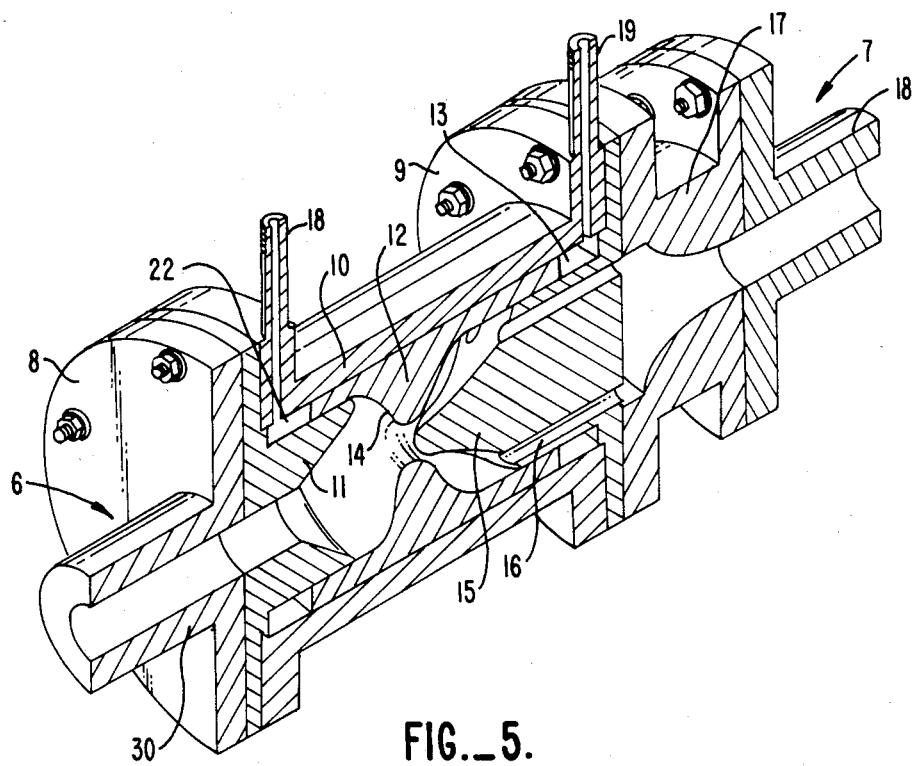
FIG._5.

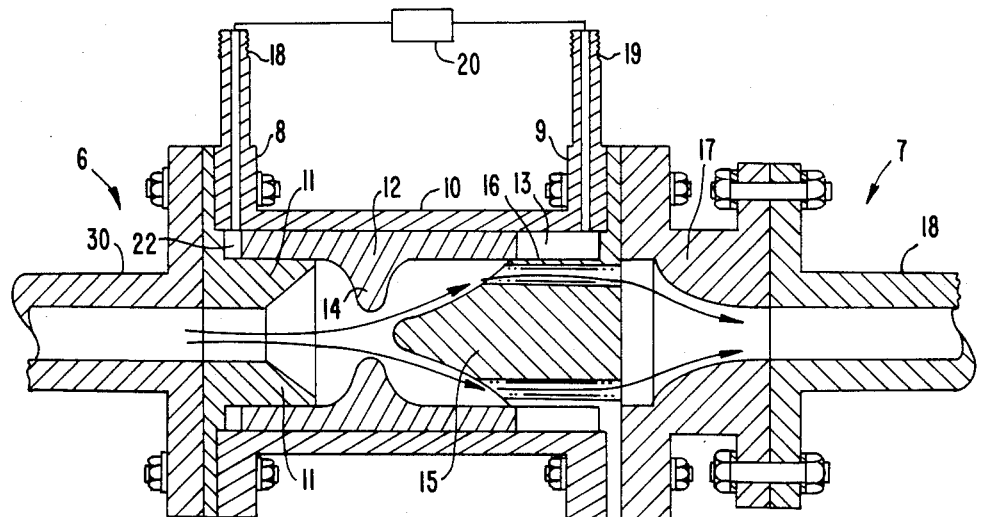
FIG._2.
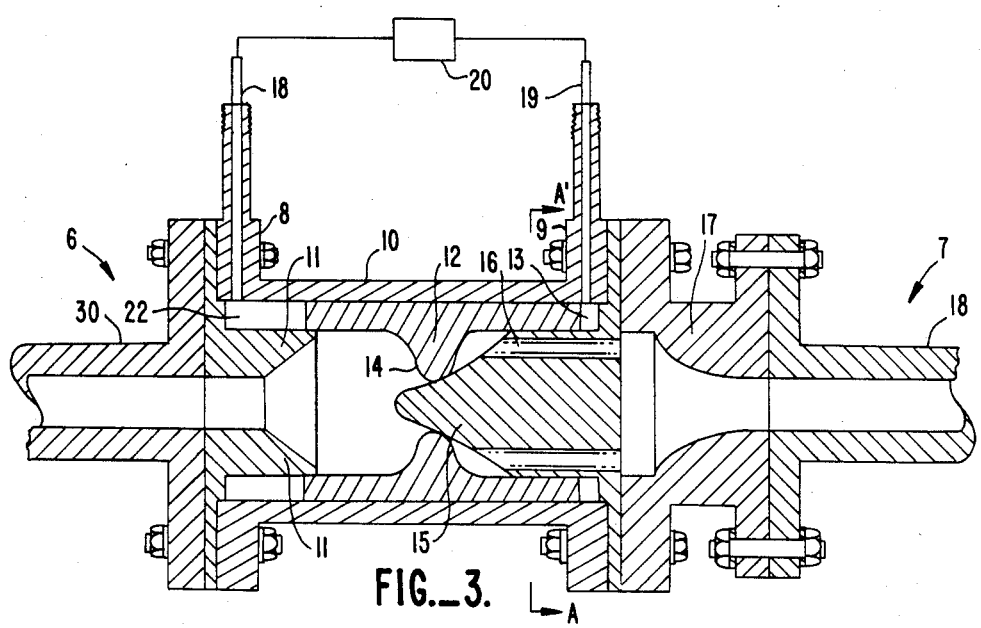
FIG._3.
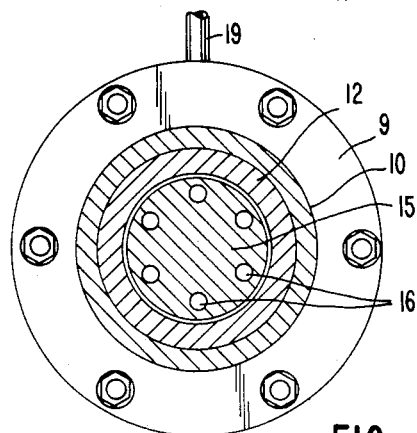
FIG._4.
(SECTION A-A')

WATER INJECTION CHOKE VALVE

FIELD OF THE INVENTION

This invention relates generally to valves for flow control. More particularly, this invention relates to valves that would be used to reduce the pressure of a flowing fluid from a high pressure to a low pressure. Still more particularly, this invention relates to valves that would be suitable for throttling the flow rate of water into a water injection well for crude oil production.

BACKGROUND OF THE INVENTION

In the production of crude oil and gas, it is frequently desirable to inject water into subsurface formations at an injection well. Water travels through the formation and displaces crude oil contained therein towards a production well.

Water injected into the subsurface formation is typically water that has been produced in association with crude oil in the vicinity of the injection well. The water is separated from the crude oil and pumped to a variety of injection wells from a central pumping location. In other cases, seawater is utilized. In a typical produced water injection system, the pumps produce pressures upwards of 4300 pounds per square inch (psi) or more.

Certain injection wells will accommodate the water injected therein more easily than others. This occurs for any one of a variety of reasons that include, for example, variations in the porosity of the subsurface formation. Water naturally flows preferentially into the wells which impose lesser resistance to flow. However, it is frequently desirable to direct larger quantities of water into wells which produce greater resistance to flow. Therefore, it is necessary to restrict the flow into many injection wells. This is commonly done with one of a variety of choke valves.

The most commonly used choke valve on water injection wells are those like the "Gray PBS Adjustable Choke" manufactured by Gray Tool Company. See also U.S. Pat. No. 4,444,220. This type of valve utilizes a vertically oriented hollow body member with an inlet oriented perpendicular to the body member. A tip assembly is raised and lowered within the body member to block or restrict fluid flow from the inlet. This type of valve has been found by the inventor to be subject to frequent failure for a number of reasons. First, the valves are designed such that the fast flow through the device is forced to turn a full 90° at the inlet. The high pressure and fast fluid velocities result in wear to the tip, vibration, and, eventually, total detachment of the tip. This problem is particularly severe in choke valves used in water injection wells because (a) the water is prone to contain sediment and the like, aggravating wear on the tip and (b) extremely high pressure drops (on the order of 2000 psi or more) are often created, resulting in very high fluid velocities. Additional problems with this type of valve result from the use of packing material (to isolate the stem used to raise and lower the tip from the outside environment).

Further, these valves frequently have many parts, resulting in a complex system which is subject to failure. For example, a seat is screwed into the valve body and is used to contact the tip for the purpose of sealing. It has been found that the threads of this seal become loose (again, due to the extreme conditions to which the interior of the valve is subjected) and rapidly errode/corrode to the point where the seat becomes unserviceable or fails. This problem is particularly troublesome because the seat is difficult to access, resulting in high costs for repair/replacement. In general, any type of internal threaded connection in a choke valve will be prone to failure due to erosion and corrosion effects.

Valves have been proposed for the control of fluids in other applications. For example, U.S. Pat. No. 1,925,531 describes a valve in which a slidable piston 15 is installed in a cylindrical valve body A. The slidable piston controls the flow of fluids by sliding around radially mounted inlet ports 4 in a housing. It is apparent that fluid flowing through the valve would have a high velocity and change direction in or near ports or edges such as those in the inlet ports. Further, when the valve is throttled, the edges of the sliding sleeve would be subjected to severe erosion/corrosion effects. These combined effects would result in failure of the valve in a short period of time.

Other types of sliding sleeve valves have been proposed (e.g., U.S. Pat. No. 2,676,611). In all of these situations it is found that an exposed edge of the sleeves and/or another portion of the valve which is necessary for proper sealing is exposed to severe erosion/corrosion effects due to its exposed nature. Other disadvantages lie in the use of a complex apparatus which is prone to failure, and the use of screwed fittings inside the valve.

It is desirable, therefore, to provide a choke valve which is simple in construction, resulting in higher reliability and easy service. It is further desirable to provide a valve which requires no internal threaded connections. It is further desirable to provide a choke valve which minimizes the number of items a flowing fluid must change direction and which does not cause fluid to change direction at a port or exposed internal edge. It is still further desirable to provide a valve which does not require packing material to isolate fluid inside the valve.

SUMMARY OF THE INVENTION

A valve for reducing the pressure of water for injection into a petroleum formation is described. The valve has a hollow, elongated cylindrical body having a horizontal axis; a cylindrical sliding sleeve member adapted to fit inside said body in a close fitting relationship therewith, said sliding sleeve having an aperture along its longitudinal axis, said aperture having a restricted portion; a plug, said plug having a face that will substantially coincide with said restricted portion when said restricted portion is pressed against said plug, and further comprising a first flow passage, said first flow passage oriented to have its axis substantially parallel to said horizontal axis, said plug member attached to said body at a first end; a sliding sleeve sealing means mounted on a second end of said body member, said sliding sleeve sealing means having a second flow passage therein; said body, said plug, and said sliding sleeve forming a first pressure control chamber; said body, said sliding sleeve sealing means, and said sliding sleeve forming a second pressure control chamber; and means for selectively increasing and decreasing pressure in said first and said second pressure control chamber such that said restricted portion can be selectively moved along said horizontal axis and against said plug member to seal said first flow passage.

BRIEF DESCRIPTION OF THE DRAWINGS

FIG. 1 is a process flow diagram illustrating the flow of produced water in an oil field.

FIG. 2 is a cross section of the valve in side view in the open position.

FIG. 3 is a cross section of the valve in side view in the closed position.

FIG. 4 is a cross section of the valve viewed from the front along line A—A'.

FIG. 5 is an isometric view of the valve, partially cutaway in the half-open position.

DETAILED DESCRIPTION OF THE INVENTION

FIG. 1 illustrates the environment in which the present invention is best suited. Crude oil and water are produced from production well 1 and are separated in separation equipment 2. Produced water from the separation equipment is pressurized at injection in pump 3 which can be a centrifugal pump, rod pump, or other type of pump known to those skilled in the art. Produced water is then pumped to one or more production wells 4. In order to regulate the flow of produced water into the injection wells, choke valves 5 are used to restrict the flow of produced water. It may also be possible to use seawater instead of produced water. Isolation valves 21 may also be provided.

FIGS. 2 and 3 illustrate the choke valve in side view cross section in the open and closed position, respectively. FIG. 4 illustrates the valve along section A—A', and FIG. 5 shows the valve in isometric view in the open position. The valve has a generically cylindrical body 10 containing an aperture therein. For the sake of convenience herein, the valve is referred to as having an upstream end and a downstream end, the upstream end referring generally to the inlet side of the valve and the downstream end generally referring to the outlet of the valve. The body has flanges 8 and 9 on its upstream and downstream ends, respectively.

The upstream end of body 10 is mounted by means of flange 8 to sliding sleeve sealing means 11. The inside of sliding sleeve sealing means 11 is generally cylindrical in shape with an extension on its downstream end. The extension forms annular space 22 with body 10 and sliding sleeve 12. The extension of sliding sleeve sealing means 11 is generally diverging towards its downstream end. Sliding sleeve sealing means 11 is connected to body 10 and upstream piping 30 by means of flanges and bolts of the type well known in the art.

Sliding sleeve 12 is generally in the shape of a cylinder and is adapted to fit snugly within body 10. The inside of the sliding sleeve has a restricted portion 14 which (moving from the upstream end) converges and then diverges in a gentle sweeping fashion.

Plug 15 is mounted to body 10 on its downstream end with flanges or the like. Plug 15 is generally boss or cone shaped and contains one or more flow passages 16. Flow passages 16 are generally parallel to a horizontal axis of the valve. Plug 15 and body 10 are flanged to reducing member 17 which generally converges to downstream piping 18.

Plug 15, body 10, and sliding sleeve 12 form annular space 13. Annular spaces 22 and 13 are provided with flow passages 18 and 19, respectively. Flow passages 18 and 19 are in turn connected to a means for selectively applying hydraulic pressure 20.

It may also be necessary to install seals (not shown) of the type well known to one skilled in the art at one or more of several locations in the valve. For example, seals may be necessary between the sliding sleeve and the sliding sleeve sealing means, between the plug and the sliding sleeve, between the sliding sleeve and the body, and between the various flanges.

In operation, pressure is applied to produced water by means of pump 3. In the absence of any action by the means for supplying hydraulic pressure 20, a small amount of water may flow out of the valve. However, the pressure applied to the upstream side of restricted portion 14 will generally tend to move sliding sleeve 12 upstream in the housing 10. Therefore, the valve is a "fail safe" valve in the sense that it will automatically close if, for example, a means for selectively applying pressure 20 fails. Means for selectively applying pressure 20 may, for example, be a pump.

When it is desirable to close the valve, pressure can be applied in annular space 22 with means 20, or released in annular space 13. This will urge the sliding sleeve against plug 15, thereby stopping the flow of water. When it is desired to permit the flow of water through the valve, pressure in annular space 22 is reduced and/or pressure in annular space 13 is relatively increased. This has the effect of urging sliding sleeve 12 away from plug 15, thereby permitting the flow of water as shown in FIG. 2. The flow of water is controlled by increasing or decreasing the pressure in spaces 13 and 22, thereby increasing or decreasing space between the restricted portion 14 of sliding sleeve 12, and plug 15. The fluid in spaces 22 and 13 can be oil, hydraulic fluid, or even produced water removed from the flow line. Pressure is preferably applied with a centrifugal pump.

The valve would be constructed of materials such as steel, stainless steel, or the like.

The advantages of the claimed device become apparent upon reviewing the appended figures. It can be seen that the invention provides a valve in which the fluid maintains a largely straight path, thereby reducing wear on the valve. Further, the fluid path is changed only along gently curving faces and not over sharp edges. It can also be seen that as the valve wears, the restricted portion and the boss shaped plug will still seal, albeit at a further downstream location. Still further, the valve is devoid of any internal screwed fittings, reducing the possibility of failure, and is of simple construction, thereby further facilitating its reliability and ease of fabrication.

It is to be understood that the invention has been described above for illustrative purposes with a great deal of particularity. For example, the valve might be used in dropping the pressure of natural gas or other fluids. The scope of the invention should not, however, be so limited, but instead should be limited only with reference to the appended claims along with the full range of equivalents to which they are entitled.

What is claimed is:

1. A valve for reducing the pressure of fluid consisting essentially of:
   a. a hollow, elongated cylindrical body having a horizontal axis;
   b. a cylindrical sliding sleeve member adapted to fit inside said body in a close-fitting relationship therewith, said sliding plug sleeve having an aperture along its longitudinal axis, said aperture having a restricted portion which converges then diverges in a gentle, sweeping fashion;
c. a plug, said plug having a face that will substantially coincide with said restricted portion when said restricted portion is pressed against said plug, and further comprising a first flow passage, said first flow passage oriented to have its axis substantially parallel to said horizontal axis, said plug member attached to said body at a first end;
d. a sliding sleeve sealing means mounted on a second end of said body member, said sliding sleeve sealing means having a second flow passage therein;
e. said body, said plug, and said sliding sleeve forming a first pressure control chamber;
f. said body, said sliding sleeve sealing means, and said sliding sleeve forming a second pressure control chamber; and
g. means for selectively increasing and decreasing pressure in said first and said second pressure control chamber, such that said restricted portion can be selectively moved along said horizontal axis and against said plug member to seal said first flow passage.

2. A valve as recited in claim 1 wherein said plug is boss shaped.

3. A valve as recited in claim 1 wherein said plug is cone shaped.

* * * * *